J. BOWRON.
VEHICLE SUPPORT.
APPLICATION FILED JUNE 16, 1911.
1,023,618.
Patented Apr. 16, 1912.
3 SHEETS—SHEET 2.
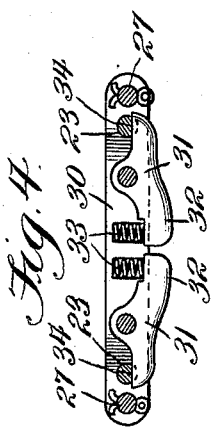
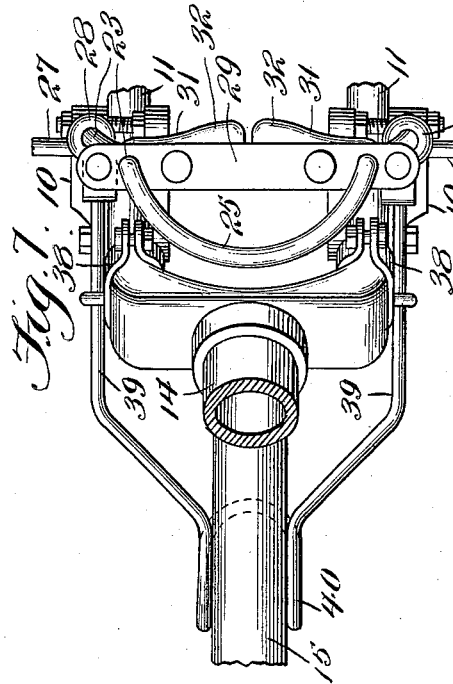
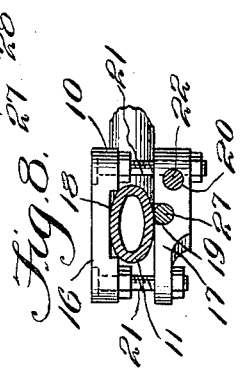
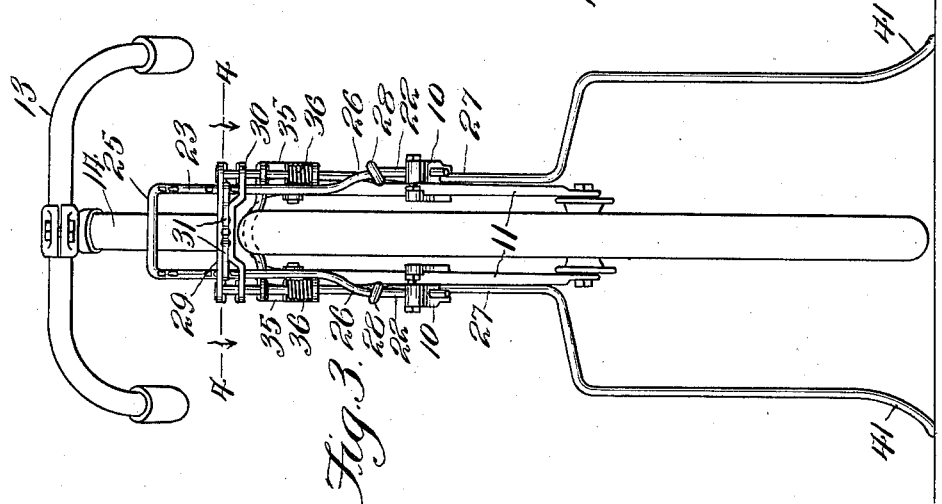
Witnesses
J. L. Wright
F. A. Hoster
Inventor
John Bowron,
By Victor J. Evans,
Attorney

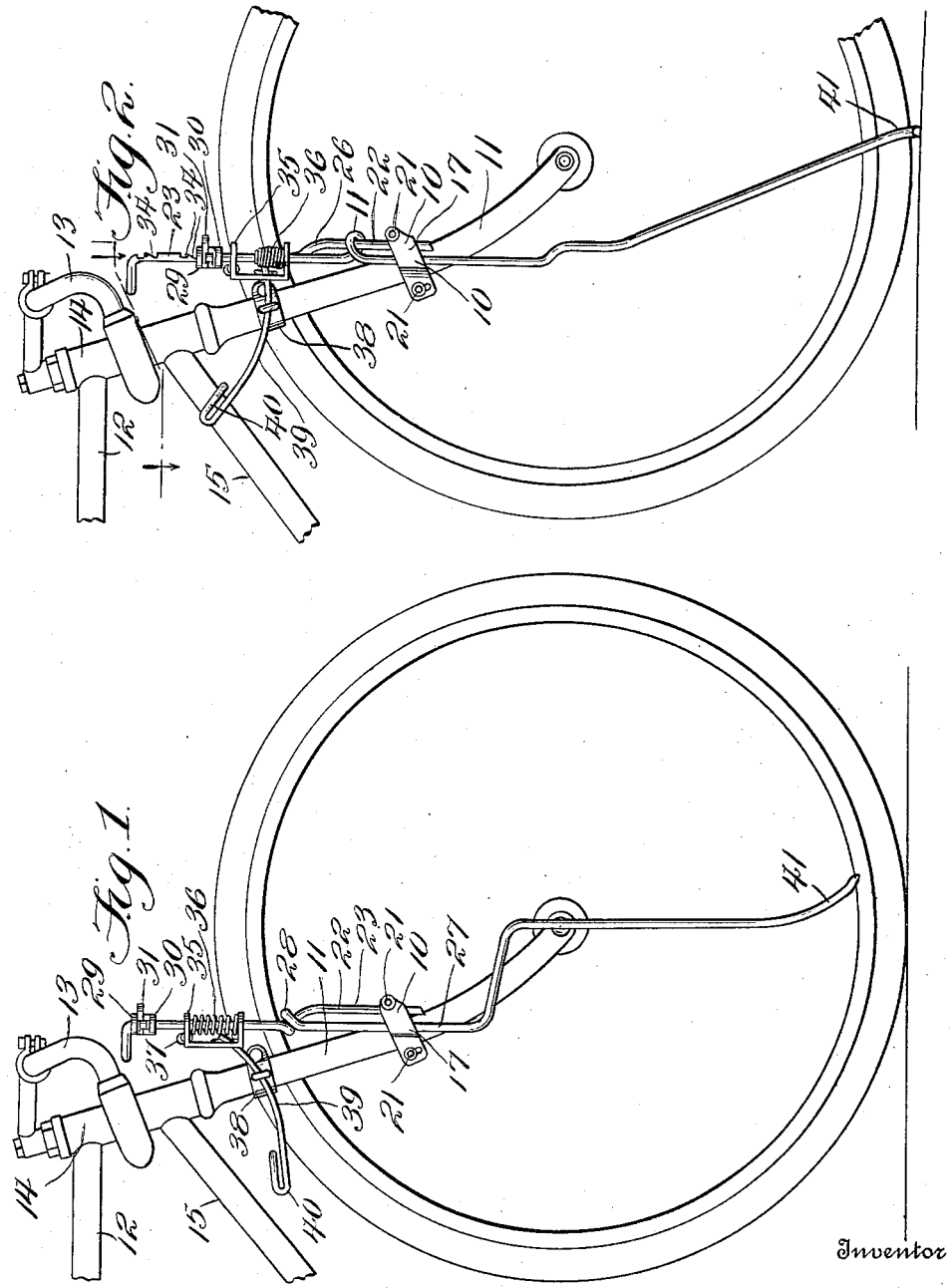

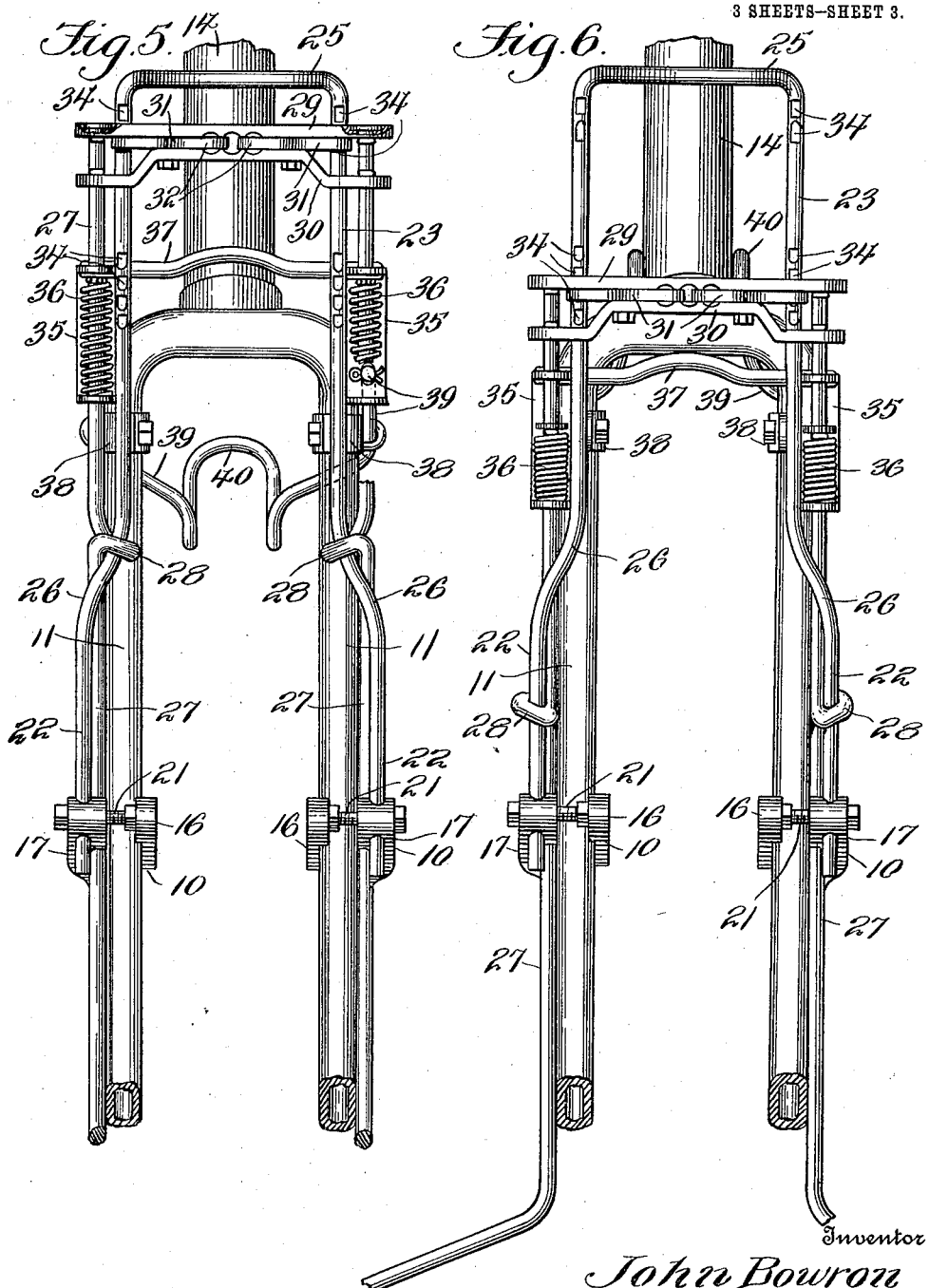

UNITED STATES PATENT OFFICE.

JOHN BOWRON, OF ROANOKE, VIRGINIA.

VEHICLE-SUPPORT.

1,023,618. Specification of Letters Patent. Patented Apr. 16, 1912.

Application filed June 16, 1911. Serial No. 633,510.

*To all whom it may concern:*

Be it known that I, JOHN BOWRON, a citizen of the United States, residing at Roanoke, in the county of Roanoke and State of Virginia, have invented new and useful Improvements in Vehicle-Supports, of which the following is a specification.

The invention relates to velocipedes, more particularly to bicycles and has for an object to provide a foldable support therefor, for supporting the vehicle in upright position.

Among other features my invention embodies an attachment for bicycles and the like, for supporting the same in upright position and at the same time exerting a pressure on the front wheel of the vehicle to retain the same in rigid position, the said support being foldable when the vehicle is in use, the fork of the vehicle being also retained in rigid position when the supporting parts are in supporting position.

For the purpose mentioned, use is made of a frame for attachment to the fork of a vehicle, a plurality of supporting bars slidably mounted on the frame and movable into folded and unfolded position, the said bars when in unfolded position being adapted to support the front part of the vehicle, a distance above the ground, means for retaining the supporting bars in rigid position, brake means operable with the said supporting bars to retain the front wheel of the vehicle in rigid position when the supporting bars are unfolded and means operable with the said supporting bars and adapted for engagement with the frame of the vehicle to retain the entire front portion of the vehicle in rigid position relatively to the remaining portion of the frame of the vehicle.

Reference is to be had to the accompanying drawings constituting a part of this specification, in which similar characters of reference denote corresponding parts in all the views and in which—

Figure 1 is a side elevation of my device showing the same in folded or inoperative position and applied to the front fork of a bicycle. Fig. 2 is a similar side elevation, showing my device in supporting position. Fig. 3 is a front view of my device showing the same in operative position. Fig. 4 is an enlarged horizontal sectional view on the line 4—4 in Fig. 3, looking in the direction of the arrow. Fig. 5 is an enlarged front elevation of the upper portion of the device, the same being shown in inoperative position. Fig. 6 is a similar enlarged front elevation of the upper portion of my device, showing the same in operative position. Fig. 7 is a sectional view taken on the line 6—6 in Fig. 2. Fig. 8 is an enlarged plan view of one of the clamps, the supporting bars and a portion of the frame being shown in section.

Referring more particularly to the various views I provide a plurality of clamps 10 for attachment to the fork 11 of a bicycle 12, the bicycle being provided with the usual handle bars 13, the head 14 and a diagonally extending brace rod 15. The clamps 10 each consist of clip members 16, 17, the clip member 16 being provided with a recess 18 and the clip member 17 being provided with apertures 19, 20, bolts 21 being provided to connect the clip members 16, 17 and the said clip members being adapted for engagement with the forked members of the fork 11, each of the forked members being disposed between each of the clip members 16, 17 as will be seen by referring to Figs. 1 and 2. Rigidly mounted in the apertures 20 of the clamps 10 is a frame 22 consisting of an integral piece of wire 23 bent in a U-shaped form and having the upper end terminating in a handle 25, the ends of the wire being slightly bent outwardly at 26 for a purpose that will be hereinafter more fully disclosed. Mounted to slide in the apertures 19 of the clamps 10 are supporting bars 27 provided with integral loops 28 through which are slidably passed the ends of the frame 22, the upper ends of the said supporting bars being secured to a cross plate 29 slidably mounted on the frame 22. Secured to the cross plate 29 and spaced therefrom is a curved plate 30 having its ends secured to the supporting bars 27 and pivotally mounted between the plate 29 and the plate 30 are a plurality of locking levers 31 having their inner ends constituting handles 32 and engaging springs 33 mounted on the plate 30, the outer ends of the locking levers 31 being adapted for engagement with notches 34 formed on the upper end of the frame 22.

Mounted to slide on the supporting bars 27 are channel plates 35 having expansible springs 36 mounted between the ends thereof, the said springs being mounted to encircle the supporting bars 27. Secured to ends of the channel plates 35 and extending transversely thereto to connect the same is a brake bar 37, the said brake bar being rigid with the channel plates. A plurality of bearing clamps 38 are rigidly secured to the fork 11 and pivotally mounted on the bearing clamps 38 is a retaining bar 39 having an inner forked end 40 for engagement with the brace 15, the said retaining bar being preferably formed of an integral piece of wire and having the outer ends pivotally connected to the channel plates 35 so that when the channel plates are moved downwardly, the inner forked end 40 of the retaining bar will move upwardly and engage the brace 15 and when the channel plates are moved upwardly the forked end 40 will be moved downwardly and disengaged from the brace 15. The lower ends of the supporting bars 27 terminate in laterally extending portions 41 constituting bases for the supporting bars and when the supporting bars are in folded position, the bases will be spaced a distance from the ground.

Now assuming that my device is in folded or inoperative position as shown in Fig. 1, when it is desired to retain the vehicle in supporting position as shown in Figs. 2 and 3, the handles 32 of the locking levers 31 are pressed inwardly against the action of the springs 33 to disengage the locking levers 31 from the frame 22. The plate 29 will now be slidable relatively to the frame 22 and by pushing downwardly on the plate the supporting bars 27 will slide downwardly on the frame 22 and owing to the outwardly bent portions 26 of the frame ends 23, when the bars 27 move downwardly they will be swung outwardly at right angles to the longitudinal plane of the vehicle, the said supporting bars when in their lowered position being adapted to extend below the periphery of a vehicle wheel 42 mounted in the usual manner on the fork 11, so that the vehicle wheel will be raised from the ground and will be supported by the supporting bars 27, the bases 41 of which will be in engagement with the ground. Now as the plate 29 is moved downwardly as mentioned, the downward movement will swing the retaining bar 39 so that the forked end 40 thereof will engage the brace 15, thus preventing any turning movement of the fork 11 relatively to the frame of the vehicle and the downward movement of the plate 29 will also cause the brake member 37 to move downwardly and engage the tire of the wheel 42 to act as a brake on the tire and prevent the wheel from revolving. The notches 34 are so positioned on the frame 22 that when the supporting bars 27 have been moved into the desired supporting position, the outer ends of the locking levers 31 actuated by the springs 33 will engage the notches 34 and retain the supporting bars in supporting position, thus preventing the same from assuming a folded position until the locking levers 31 are released from engagement with the notches 34. Thus it will be seen that in one operation the front portion of the vehicle is raised from the ground and retained in supporting position, the fork of the vehicle is prevented from turning or swinging relatively to the frame thereof and the wheel mounted on the fork is prevented from revolving and will be held in rigid position by the brake bar 27.

The supporting bars 27 being in supporting position, when it is desired to move the same into folded or non-supporting position, the handles 32 of the locking levers 31 are pressed inwardly against the springs 33, thus releasing the levers 31 from engagement with the frame 22 and moving the levers out of the notches 34 to permit the supporting bars to move into folded position. As the supporting bars move upwardly and into folded position, the brake bar 37 will also move upwardly and out of engagement with the tire of the wheel 42 and the retaining bar 39 will be operated so that the end 40 will be disengaged from the brace 15.

From the foregoing description it will be seen that an efficient and easily operable attachment for velocipedes and other vehicles is provided, the said device being conveniently positioned on the vehicle and arranged so that in one operation the front of the vehicle can be moved a distance from the ground and supported, the wheel mounted in the fork will be retained in rigid position and prevented from revolving and the fork of the vehicle will be rigidly held and prevented from swinging or turning relatively to the frame of the vehicle.

My device is particularly adaptable for use on motor cycles and similar motor vehicles and although for the purpose of describing my invention I have shown a particular construction thereof, it will be understood that various changes may be made without departing from the spirit of the invention and the scope thereof is defined in the appended claims.

Having thus fully described the invention, what I claim as new, is:—

1. In a vehicle support the combination of a frame for attachment to the fork of the vehicle, the said frame being provided at its upper end with a series of notches, a plurality of supporting bars slidably mounted on the said frame and movable into positions above and below the tread of the vehicle wheel, a cross plate secured to the said supporting bars and slidable on the frame, locking levers mounted on the said cross plate and adapted to engage the notches on the said frame to retain the supporting bars in rigid position, a brake bar mounted to operate with the said supporting bars to engage the tread of the vehicle wheel and a retaining bar mounted to operate with the said supporting bars to engage the frame of the vehicle when the supporting bars are in supporting position.

2. In a vehicle support the combination of a frame for attachment to the fork of the vehicle, the said frame being provided at its upper end with a series of notches, a plurality of supporting bars slidably mounted on the said frame and movable into positions above and below the tread of the vehicle wheel, a cross plate secured to the said supporting bars and slidable on the frame, spring controlled locking means mounted on the said cross plate and adapted to engage the notches on the said frame to retain the supporting bars in rigid position, a brake bar mounted to operate with the said supporting bars to engage the tread of the vehicle wheel and a retaining bar mounted to operate with the said supporting bars to engage the frame of the vehicle when the supporting bars are in supporting position.

3. In a vehicle support the combination of a frame for attachment to the fork of a vehicle, supporting bars mounted to slide on the said frame and movable into supporting or nonsupporting position, a brake bar operable with the supporting bars to engage the tread of the vehicle wheel when the supporting bars are in supporting position, a retaining bar operable with the supporting bars to engage the frame of the vehicle when the supporting bars are in supporting position and means for retaining the supporting bars in supporting or non-supporting position.

4. In a vehicle support the combination of a frame for attachment to the fork of a vehicle, supporting bars mounted to slide on the said frame and movable into supporting or non-supporting position, a brake bar operable with the supporting bars to engage the tread of the vehicle wheel when the supporting bars are in supporting position, a retaining bar operable with the supporting bars to engage the frame of the vehicle when the supporting bars are in supporting position and locking means for retaining the supporting bars in supporting or non-supporting position.

5. In a vehicle support the combination of a frame for attachment to the fork of a vehicle, supporting bars mounted to slide on the said frame and movable into supporting or non-supporting position, a brake bar operable with the supporting bars to engage the tread of the vehicle wheel when the supporting bars are in supporting position, a retaining bar operable with the supporting bars to engage the frame of the vehicle when the supporting bars are in supporting position and spring actuated locking means for retaining the supporting bars in supporting or non-supporting position.

6. In a vehicle support the combination of a frame for attachment to the fork of a vehicle, supporting bars mounted to slide on the said frame and movable into supporting or non-supporting position, a brake bar operable with the supporting bars to engage the tread of the vehicle wheel when the supporting bars are in supporting position, a retaining bar operable with the supporting bars to engage the frame of the vehicle when the supporting bars are in supporting position and a plurality of spring actuated locking levers for retaining the supporting bars in supporting or non-supporting position.

7. In a vehicle support the combination of a frame for rigid engagement with the fork of the vehicle, supporting bars slidable on the frame and movable into supporting or non-supporting position, a brake rod mounted on the said supporting bars and operable therewith, a retaining bar pivotally mounted on the fork of the vehicle and connected to the said supporting bars to operate therewith to retain the fork of the vehicle in rigid position relatively to the frame of the vehicle when the supporting bars are in supporting position, the said brake bar being adapted to engage the vehicle wheel and retain the same in rigid position relatively to the fork of the vehicle when the supporting bars are in supporting position and locking levers mounted on the said supporting bars and adapted for engagement with the said frame to retain the supporting bars in supporting or non-supporting position.

8. In a vehicle support the combination of a pair of clips for attachment to the fork of a vehicle, a frame carried by the said clips, supporting bars mounted to slide on the said frame and extending through apertures in the said clips, the said supporting bars being movable into supporting or non-supporting position, means for retaining the supporting bars in supporting position and means mounted to operate with the said supporting bars to engage the wheel of the vehicle and retain the same in rigid position relatively to the vehicle frame when the supporting bars are in supporting position.

9. In a vehicle support the combination of a plurality of supporting bars slidably mounted on the frame of the vehicle and movable into supporting or non-supporting position, means for retaining the supporting bars in supporting position, brake means mounted to operate with the supporting bars to engage the wheel of the vehicle and retain the same in rigid position relatively to the vehicle frame when the supporting bars are in supporting position and retaining means mounted to operate with the supporting bars and retain the fork of the vehicle in rigid position relatively to the frame thereof when the supporting bars are in supporting position.

10. In a vehicle support a plurality of clips for attachment to the fork of a vehicle, a frame secured to the said clips and extending upwardly therefrom, the said frame being provided with a series of notches and having the lower portions thereof bent outwardly, a plurality of supporting bars mounted to slide on the said frame, loops formed on the said supporting bars and having the frame extended therethrough and locking levers mounted to operate with the said supporting bars and adapted to engage the notches in the said frame to retain the supporting bars in supporting or non-supporting position.

In testimony whereof I affix my signature in presence of two witnesses.

JOHN BOWRON.

Witnesses:
J. E. GISH,
MAY MANESS.

Copies of this patent may be obtained for five cents each, by addressing the "Commissioner of Patents, Washington, D. C."